(12) United States Patent
Xu

(10) Patent No.: US 9,549,428 B2
(45) Date of Patent: Jan. 17, 2017

(54) METHOD AND SYSTEM FOR COMMUNICATION BETWEEN DEVICES IN PROXIMITY, NETWORK SIDE DEVICE AND USER EQUIPMENT

(75) Inventor: Hui Xu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 179 days.

(21) Appl. No.: 14/366,348

(22) PCT Filed: Feb. 20, 2012

(86) PCT No.: PCT/CN2012/071351
§ 371 (c)(1),
(2), (4) Date: Jun. 18, 2014

(87) PCT Pub. No.: WO2013/091300
PCT Pub. Date: Jun. 27, 2013

(65) Prior Publication Data
US 2014/0328310 A1     Nov. 6, 2014

(30) Foreign Application Priority Data

Dec. 23, 2011 (CN) .......................... 2011 1 0437670

(51) Int. Cl.
*H04W 4/00* (2009.01)
*H04W 76/02* (2009.01)
(Continued)

(52) U.S. Cl.
CPC ......... *H04W 76/023* (2013.01); *H04B 7/2606* (2013.01); *H04W 4/008* (2013.01); *H04W 72/042* (2013.01); *H04W 92/18* (2013.01)

(58) Field of Classification Search
None
See application file for complete search history.

(56) References Cited

U.S. PATENT DOCUMENTS

2004/0121766 A1  6/2004  Benson
2010/0011110 A1  1/2010  Doppler
(Continued)

FOREIGN PATENT DOCUMENTS

CN  102132625 A  7/2011
CN  102246575 A  11/2011
(Continued)

OTHER PUBLICATIONS

International Search Report in international application No. PCT/CN2012/071351, mailed on Oct. 4, 2012.
(Continued)

*Primary Examiner* — Minh-Trang Nguyen
(74) *Attorney, Agent, or Firm* — Oppedahl Patent Law Firm LLC

(57) ABSTRACT

A method and a system for communication between devices in proximity, a network side device and a User Equipment (UE) are disclosed. The method includes that: a network side device determines whether UEs meet a direct Device to Device (D2D) communication condition; when the network side device determines that the UEs meet the direct D2D communication condition, the network side device informs the UEs of the result of the determination, and configures resources for direct D2D communication for the UEs according to requirements of the UEs; and when the network side device determines that the UEs do not meet the direct D2D communication condition, the network side device configures resources for architecture communication for the UEs according to the requirements of the UEs. The disclosure can implement D2D communication between devices in proximity, reduce network load and relieve the dependence of the D2D communication on a network.

20 Claims, 6 Drawing Sheets

(51) Int. Cl.
*H04W 72/04* (2009.01)
*H04B 7/26* (2006.01)
*H04W 92/18* (2009.01)

(56) References Cited

U.S. PATENT DOCUMENTS

| | | |
|---|---|---|
| 2011/0268004 A1 | 11/2011 | Doppler |
| 2011/0312331 A1 | 12/2011 | Hakola |
| 2012/0093098 A1 | 4/2012 | Charbit |
| 2012/0149408 A1* | 6/2012 | Steer .................. H04W 76/023 455/466 |
| 2013/0150051 A1 | 6/2013 | Van Phan |
| 2014/0135019 A1* | 5/2014 | Jang .................. H04W 76/043 455/437 |
| 2014/0185587 A1 | 7/2014 | Jang |

FOREIGN PATENT DOCUMENTS

| | | |
|---|---|---|
| CN | 102282901 A | 12/2011 |
| EP | 2753122 A2 | 7/2014 |
| WO | 2011147462 A1 | 12/2011 |
| WO | 2011158141 A1 | 12/2011 |

OTHER PUBLICATIONS

English Translation of the Written Opinion of the International Search Authority in international application No. PCT/CN2012/071351, mailed on Oct. 4, 2012.
Supplementary European Search Report in European application No. 12860170.5, mailed on Jan. 21, 2016.

* cited by examiner

METHOD AND SYSTEM FOR COMMUNICATION BETWEEN DEVICES IN PROXIMITY, NETWORK SIDE DEVICE AND USER EQUIPMENT

TECHNICAL FIELD

The disclosure relates to the field of mobile communication technologies, and in particular to a method and system for communication between devices being in proximity to each other, a network side device and a User Equipment (UE).

BACKGROUND

Machine to Machine (M2M) refers to all technologies and means for establishing a connection between machines. The concept of M2M has been proposed in the 1990s but is only remained at a theoretical stage. Networking of machines implemented by using mobile communication technologies becomes possible due to the development of mobile communication technologies after 2000. An M2M service has emerged on the market around 2002, and has become a focus of attention of numerous communication equipment suppliers and telecom operators after the rapid development of the subsequent years. At present, the competition in telecommunication market is increasingly fierce, accompanied with the continuous reduction in telecom price and the profit margin of operators. Moreover, the human-based communication market is getting saturated. In this case, the M2M means a brand-new development opportunity for operators.

Researches on application scenarios of M2M communication show that the implementation of M2M communication on a mobile network has a potential market prospect. However, as an M2M service has many new requirements on a system, to enhance the competitiveness of mobile networks in this aspect, it is necessary to optimize existing mobile networks to provide more effective support for M2M communication.

Mainly designed for Human to Human (H2H) communication, existing mobile architecture networks are not optimal for M2M communication or human to machine communication. Besides, how to provide an M2M communication service at a low cost is also a key to success in deployment of M2M communication.

Based on the above situation, it is necessary to put forward a solution to the support of mobile networks to M2M communication, by using which the existing networks may be reused best and the influence caused by a great amount of M2M communication on networks as well as the complexity of operation and maintenance may be reduced.

To use mobile network resources effectively, the 3rd Generation Partnership Project (3GPP) has proposed Machine Type Communication (MTC), that is, services for M2M and machine to human communications, which is far beyond conventional H2H communication in service range and is greatly difference from existing H2H communication modes in access control, charging, security, Quality of Service (QoS), service mode and the like.

Device to Device (D2D) communication refers to direct communication between devices being in proximity to each other, such as Bluetooth devices. On account of lack of network management and control, an unlicensed spectrum, such as 2.4 GHz, is generally used in D2D communication. With the rapid popularization of smart phones, many new applications arise, such as position-based applications and social applications. In a mobile architecture network, the communication between UEs must be implemented by a network, even for two devices being in proximity to each other, as shown in FIG. 1. This is because a network operator needs to manage and control a licensed spectrum by using which communication is implemented between two communication parties through a network which is indispensable for the communication for the sake of the resource scheduling for communication activities, the charging for the communication activities and the management on the communication activities. At present, the idea of direct communication between devices being in proximity to each other, as shown in FIG. 2, has been put forward to reduce network load. The direct communication between MTC devices is also needed in MTC, for example, in a capillary network, the communication between MTC devices and between an MTC device and a gateway are required. Furthermore, the 3GPP is also carrying on research on D2D communication.

During researching and experiencing existing technologies, the present inventor has found the following problems in the existing technologies: who should make a decision on whether to adopt D2D communication; how to control the D2D communication by using a licensed spectrum by a network; how to deal with the situation that devices to be communication are out of the coverage of a proximity area where direct D2D communication is available; and the like. No solution to the above problems has been proposed.

SUMMARY

In view of this, the disclosure provides a method and system for communication between devices being in proximity to each other, a network side device and a UE, so as to solve the problem of direct communication between devices in proximity.

To this end, the technical solutions of the disclosure are implemented as follows.

The disclosure provides a method for communication between devices in proximity, which includes that:

a network side device determines whether UEs meet a direct D2D communication condition;

when the network side device determines that the UEs meet the direct D2D communication condition, the network side device informs the UEs of the result of the determination, and configures resources for direct D2D communication for the UEs according to requirements of the UEs; and when the network side device determines that the UEs do not meet the direct D2D communication condition, the network side device configures resources for architecture communication for the UEs according to the requirements of the UEs.

After the network side device determines that UEs do not meet the direct D2D communication condition, the method may further include that:

the network side device determines whether the UEs meet a condition for D2D communication through a relay; when the UEs meet the condition for D2D communication through a relay, the network side device configures for the UEs a D2D communication path including a relay; and when the UEs do not meet the condition for D2D communication through a relay, the network side device configures the resources for the architecture communication for the UEs.

The D2D communication condition may comprise: the UEs are in the coverage of a proximity area where direct D2D communication is available, and each of the UEs has a D2D communication capability.

The condition for D2D communication through a relay may comprise: the UEs are out of the coverage of a proximity area where the direct D2D communication is available, each of the UEs has a D2D communication capability, and there is a relay having a communication relay capability for providing communication relay for the UEs.

The requirements of the UEs may include that:

the UEs initiate a communication request; or after the network side device informs the UEs of the result of the determination, the UEs send a D2D confirmation indication message to the network side device when the UEs select to start the D2D communication.

The method may further include that:

during a process of the communication between the UEs, the network side device performs switching between a direct D2D communication mode and an architecture communication mode according to spacing distance between the UEs.

The method may further include that:

during a process of the communication between the UEs, the network side device performs switching among a direct D2D communication mode, a mode where D2D communication is implemented through a relay and an architecture communication mode according to spacing distance between the UEs.

The disclosure also provides a system for communication between devices in proximity, which includes: a network side device and UEs, wherein the network side device is configured to: determine whether the user equipments meet a direct Device to Device (D2D) communication condition; when the network side device determines that the UEs meet the direct D2D communication condition, inform the UEs of the result of the determination, and configure resources for direct D2D communication for the UEs according to requirements of the UEs; and when the network side device determines that the UEs do not meet the direct D2D communication condition, configure resources for architecture communication for the UEs according to the requirements of the UEs; and the UEs are configured to communicate with each other by using the resources configured by the network side device.

The system may further include: a relay;

wherein the network side device may be further configured to: after the network side device determines that the UEs do not meet the direct D2D communication condition, determine whether the UEs meet a condition for D2D communication through a relay; when the UEs meet the condition for D2D communication through a relay, configure for the UEs a D2D communication path including the relay; and when the UEs do not meet the condition for D2D communication through a relay, configure the resources for architecture communication for the UEs; and wherein the relay may be configured to provide a data relay service for the UEs between which D2D communication is implemented through the relay.

The D2D communication condition may include: the UEs are in the coverage of a proximity area where direct D2D communication is available, and each of the UEs has a D2D communication capability.

The condition for D2D communication through a relay may include: the UEs are out of the coverage of a proximity area where the direct D2D communication is available, each of the UEs has a D2D communication capability, and there is a relay having a communication relay capability for providing communication relay for the UEs.

The requirements of the UEs may include that:

the UEs initiate a communication request; or after the network side device informs the UEs of the result of the determination, the UEs send a D2D confirmation indication message to the network side device when the UEs select to start the D2D communication.

The network side device may be further configured to:

during a process of the communication between the UEs, perform switching between a direct D2D communication mode and an architecture communication mode according to spacing distance between the UEs.

The network side device may be further configured to:

during a process of the communication between the UEs, perform switching among a direct D2D communication mode, a mode where D2D communication is implemented through a relay and an architecture communication mode according to spacing distance between the UEs.

The disclosure also provides a network side device, which includes: a determination module and a resource configuration module, wherein the determination module is configured to determine whether UEs meet a direct D2D communication condition and informs the resource configuration module of the result of the determination; and the resource configuration module is configured to: when the result of the determination of the determination module is that the UEs meet the direct D2D communication condition, inform the UEs of the result of the determination, and configure resources for direct D2D communication for the UEs according to requirements of the UEs; and when the result of the determination of the determination module is that the UEs do not meet the direct D2D communication condition, configure resources for architecture communication for the UEs according to the requirements of the UEs.

The determination module may be further configured to, after the network side device determines that the UEs do not meet the direct D2D communication condition, determine whether the UEs meet a condition for D2D communication through a relay, and inform the resource configuration module of the result of the determination; and the resource configuration module may be further configured to configure for the UEs a D2D communication path including a relay when the determination module determines that the UEs meet the condition for D2D communication through a relay, or configure the resources for the architecture communication to e UEs when the determination module determines that the UEs do not meet the condition for D2D communication through a relay.

The D2D communication condition may comprise: the UEs are in the coverage of a proximity area where direct D2D communication is available, and each of the UEs has a D2D communication capability.

The condition for D2D communication through a relay may comprise: the UEs are out of the coverage of a proximity area where the direct D2D communication is available, each of the UEs has a D2D communication capability, and there is a relay having a communication relay capability for providing communication relay for the UEs.

The network device may further include: a communication switching module configured to perform switching between a direct D2D communication mode and an architecture communication mode according to the spacing distance between the UEs during a process of the communication between the UEs.

The network device may further include: a communication switching module configured to perform switching among a direct D2D communication mode, a mode where D2D communication is implemented through a relay and an architecture communication mode according to the spacing distance between the UEs during a process of the communication between the UEs.

The disclosure also provides a UE, which includes: a sending module and a receiving module, wherein the sending module is configured to send subscription data supportive of D2D communication to a network side device and send communication data by using resources configured by the network side device; and the receiving module is configured to receive the communication data by using the resources configured by the network side device, wherein the resources configured by the network side device include: resources for direct D2D communication, a D2D communication path including a relay or resources for architecture communication.

The receiving module may further be configured to receive a proximity area notification message from the network side device; and the sending module may further be configured to send a D2D confirmation indication message to the network side device after the receiving module receives the proximity area notification message.

The method and the system for communication between devices in proximity, the network side device and the UE provided by the disclosure can implement D2D communication between devices in proximity, reduce network load and relieve the dependence of the D2D communication on a network.

DETAILED DESCRIPTION

Figure 1:
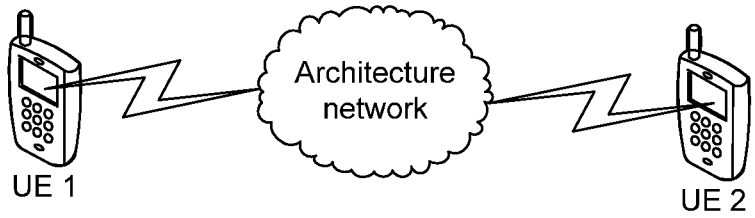
FIG. 1 is a schematic diagram illustrating existing architecture communication.
Figure 2:
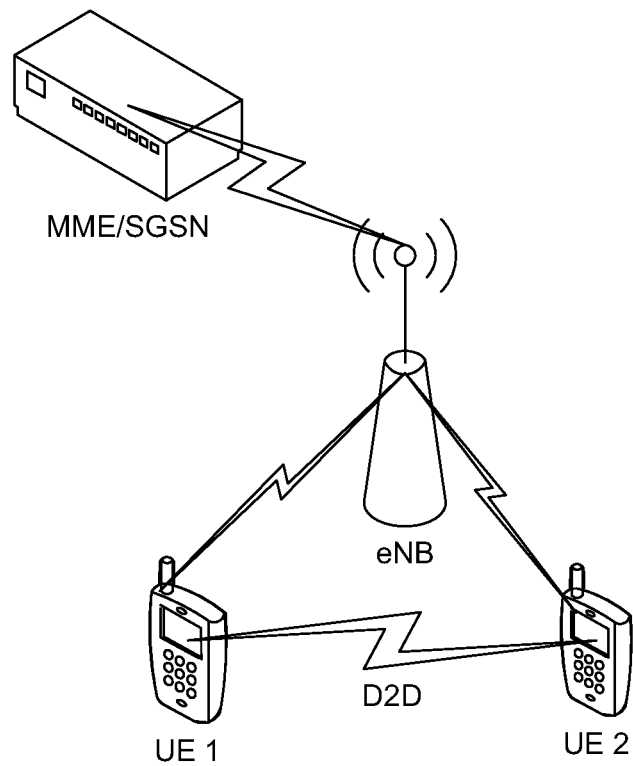
FIG. 2 is a schematic diagram illustrating conceived D2D communication.

The technical solution of the disclosure is further elaborated below in combination with the drawings and specific embodiments.

A method for communication between devices in proximity provided by the disclosure includes that: a network side device determines whether UEs meet a direct D2D communication condition; when the network side device determines that the UEs meet the direct D2D communication condition, the network side device informs the UEs of the result of the determination, and configures resources for direct D2D communication for the UEs according to requirements of the UEs; and when the network side device determines that the UEs do not meet the direct D2D communication condition, the network side device configures resources for architecture communication for the UEs according to the requirements of the UEs.

Another method for communication between devices in proximity includes that: a network side device determines whether UEs meet a direct D2D communication condition; when the network side device determines that the UEs meet the direct D2D communication condition, the network side device informs the UEs of the result of the determination, and configures resources for direct D2D communication for the UEs according to requirements of the UEs; and when the network side device determines that the UEs do not meet the direct D2D communication condition, the network side device determines whether the UEs meet a condition for D2D communication through a relay, and the network side device, the network side device configures for the UEs a D2D communication path including a relay when the UEs meet the condition for D2D communication through a relay, and the network side device configures resources for architecture communication for the UEs when the UEs do not meet the condition for D2D communication through a relay.

The D2D communication condition includes: the UEs are in the coverage of a proximity area where direct D2D communication is available, and each of the UEs has a D2D communication capability.

The condition for D2D communication through a relay includes: the UEs are out of the coverage of the proximity area where the direct D2D communication is available, each of the UEs has a D2D communication capability, and there is a relay having a communication relay capability for providing communication relay for the UEs.

The requirements of the UEs include that:

the UEs initiate a communication request; or after the network side device informs the UEs of the result of the determination, the UEs send a D2D confirmation indication message to the network side device when the UEs select to start the D2D communication.

In addition, during the process of the communication between the UEs, the network side device performs switching between a direct D2D communication mode and an architecture communication mode according to the spacing distance between the UEs, or performs switching among the direct D2D communication mode, a mode where D2D communication is implemented through a relay and the architecture communication according to the spacing distance between the UEs. The switching is still determined on the basis of the D2D communication condition and the condition for D2D communication through a relay.

For example, an architecture communication mode may be switched to a direct D2D communication mode if the UEs are in the coverage of the proximity area where the direct D2D communication is available, and the UEs to be communicated with each other both have the D2D communication capability; and the direct D2D communication mode may be switched to the architecture communication mode if the UEs are out of the coverage of the proximity area where the direct D2D communication is available due to the movement of the UEs.

Alternatively, the architecture communication mode may be switched to the direct D2D communication mode if the UEs are in the coverage of the proximity area where direct D2D communication is available and each of the UEs has the D2D communication capability; the direct D2D communication mode may be switched to a mode where D2D communication is implemented through a relay if the UEs are out of the coverage of the proximity area where the direct D2D communication is available due to the movement of the UEs, the UEs both have the D2D communication capability, and there is a relay having a communication relay capability for providing communication relay for the UEs; and the mode where D2D communication is implemented through a relay may be switched to the architecture communication mode if the UEs are out of the coverage of the proximity area where the direct D2D communication is available due to the movement of the UEs and there is no relay having the communication relay capability for providing communication relay for the UEs.

Figure 3:
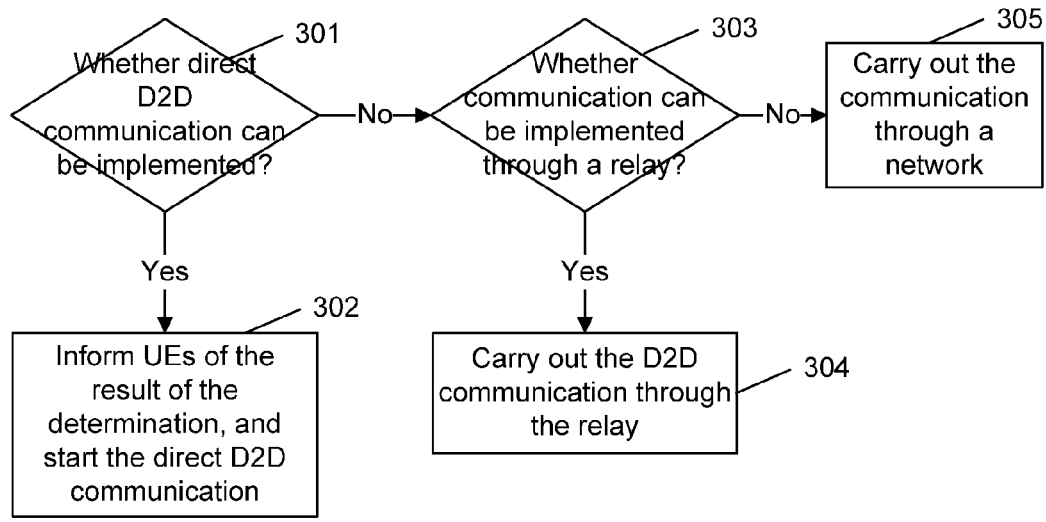
FIG. 3 is a flowchart illustrating a method for communication between devices in proximity according to the disclosure.

As shown in FIG. 3, a method for communication between devices in proximity according to an embodiment of the disclosure mainly includes the following steps:

Step 301: A network side device determines whether direct D2D communication can be implemented. When the direct D2D communication can be implemented, Step 302 is executed. When no direct D2D communication can be implemented, Step 303 is executed.

When the network side device detects that UEs to be communicated with each other are in the coverage of the proximity area where direct D2D communication is available or that there are UEs in the coverage of the proximity area where direct D2D communication is available, the network side device voluntarily determines whether the D2D communication can be implemented, that is, the network side device voluntarily determines whether the UEs meet the D2D communication condition.

The network side device determines, according to the spacing distance between UEs to be communicated with each other and the capability of the UEs to be communicated with each other, whether the D2D communication condition is currently met, that is, the network side device determines whether the UEs are in the coverage of the proximity area where the direct D2D communication is available, and whether each of the UEs has a D2D communication capability. If the UEs are in the coverage of the proximity area where the direct D2D communication is available, and the UEs to be communicated with each other have the D2D communication capability, the network side device determines that the D2D communication condition is met currently and the UEs to be communicated with each other can implement the direct D2D communication; otherwise, the network side device determines that the UEs to be communicated with each other cannot implement the direct D2D communication.

The coverage of the proximity area where the direct D2D communication is available may be preset, for example, the coverage of the proximity area where the direct D2D communication is available may be regulated through Operation Administration and Maintenance (OAM) or a protocol. D2D communication capability stored in subscription data or Universal Subscriber Identity Modules (USIM) of the UEs can be acquired by the network side device.

Step 302: The network side device informs the UEs of the result of the determination (that is, sending a proximity area notification message to the UEs) and configures resources for direct D2D communication for the UEs according to requirements of the UEs, and the UEs implement the direct D2D communication by using the resources. The flow ends after the direct D2D communication is completed.

The proximity area notification message refers to a proximity area notification message sent by the network side device to a UE if there are other UEs in the coverage of a proximity area of a UE and the network side device detects there are two or more UEs in the coverage of the proximity area. Generally, a UE subscribing a D2D function may receive the proximity area notification message.

The requirements of the UEs refer to: the UEs initiate a communication request; or after the UEs receive the proximity area notification message from the network side device, the UEs send a D2D confirmation indication message to the network side device when the UEs select to start the D2D communication.

If the UEs select to start the D2D communication, the network side device configures radio resources for the D2D communication, assigns IP addresses for the parties needing to implement the D2D communication, and charges for and manages the D2D communication. After the D2D communication ends, the network side device releases the communication resources for the D2D communication. The radio resources for the D2D communication typically use a licensed spectrum, that is, a spectrum used by an operator. In the D2D communication, communication for a user plane is directly implemented by a UE while communication for a control panel is implemented by a network side, thereby achieving the management and control of the network side on the D2D communication.

Furthermore, users participating in the D2D communication are unaware of proceeding of the communication by means of the D2D communication mode as the D2D communication is transparent for the users.

Step 303: The network side device determines whether communication can be currently implemented through a relay. If the communication can be currently implemented through the relay, Step 304 is executed. If the communication cannot be currently implemented through the relay, Step 305 is executed.

The network side device continues, according to the spacing distance between the UEs to be communicated with each other and the capability of the UEs to be communicated with each other, to determine whether a condition for D2D communication through a relay is currently met. The condition for D2D communication through a relay is that: the UEs are out of the coverage of the proximity area where the direct D2D communication is available, the UEs to be communicated with each other have the D2D communication capability, and there is a relay having a communication relay capability for providing communication relay for the UEs. The relay may be a UE or an eNB.

If the UEs participating in the D2D communication are located in the range of the same eNB, then the D2D communication may be implemented between the UEs through an eNB or another relay UE, that is, Step 304 is executed. If the D2D communication cannot be implemented between the UEs participating in the D2D communication through an eNB or another relay, then the UEs communicate with each other through a network, that is, Step 305 is executed. The relay is required to have the communication relay capability, and the network side device determines, according to subscription data, whether a relay has the communication relay capability.

Step 304: The network side device configures a D2D communication path including a relay, and the UEs implement the D2D communication through the D2D communication path. The flow ends after the D2D communication is completed.

Service data of a source UE are forwarded to a target UE through a relay. The network side device selects an appropriate relay to implement the D2D communication relay according to integrative factors including the position and the load of relays. The relay forwards the service data transparently, that is, forwards the service data to the target UE without processing the service data. The relay is transparent to a D2D user, that is, the D2D user is unaware of the existence of the relay.

When the D2D communication ends, if the UE sends a communication completion request to the network side device, then the network side device releases the resources for the D2D communication, including the resources of the relay.

Step 305: The network side device configures resources for architecture communication for the UEs according to the requirements of the UEs, and the UEs communicate with each other through a network by using the resources. The normal architecture communication is shown in FIG. 1 and is not described herein repeatedly.

The method for communication between devices in proximity is further elaborated below in combination with specific embodiments.

Figure 4:
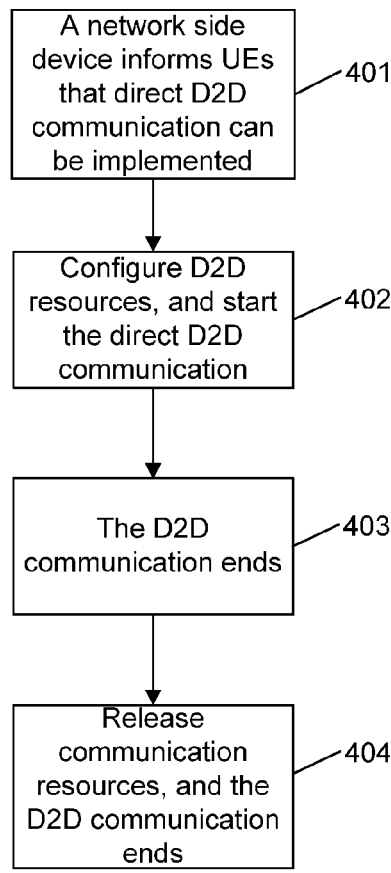
FIG. 4 is a flowchart illustrating a method for communication between devices in a scenario where D2D communication is implemented in the coverage of a proximity area where direct D2D communication is available according to a first embodiment of the disclosure.

A method for communication between devices in a scenario where D2D communication is implemented in the coverage of the proximity area where direct D2D communication is available according to a first embodiment of the disclosure is as shown in FIG. 4. The method mainly includes the following steps:

Step 401: A network side device determines that D2D communication can be implemented currently, and informs UEs of the result of the determination.

Step 402: The network side device configures resources for the D2D communication, and the D2D communication is started.

The implementation of the D2D communication is required to meet the following two conditions: 1. UEs to be communicated with each other have the D2D communication capability; and 2. the UEs are in the coverage of the proximity area where the direct D2D communication is available. The network side device determines, by querying subscription data, whether the UEs have the D2D communication capability, for example, the network side device inquires of a Home Subscriber Server (HSS)/Home Subscriber Server (HLR) about the subscription data of the UEs.

If the network side device determines that the UEs meet the D2D communication condition, the network side device configures the resources for the D2D communication. The resources for the D2D communication include a frequency of a physical layer, a time slot, modulation codes, an antenna port, an upper-layer IP address, and a Transmission Control Protocol (TCP)/User Datagram Protocol (UDP) port.

After the resources for the D2D communication are configured, the UEs can implement the direct D2D communication each other by using the configured resources. The network side device monitors the D2D communication to guarantee the quality of the D2D communication and charge for the D2D communication.

The D2D communication is transparent for a user, that is, the user is unaware of proceeding of the D2D communication.

Step 403: The D2D communication ends.

The D2D communication ends when the D2D communication is completed or when there is another reason (e.g., there is a call of a higher priority or an emergency call) or when the UEs communicating with each other are out the coverage of a proximity area where the direct D2D communication is available.

Step 404: The network side device releases the resources for the D2D communication, and the D2D communication ends.

The network side device releases the resources for the D2D communication, and the D2D communication ends accordingly.

If the communication is not completed, then the network side device may continue the communication by switching the communication mode to the architecture communication mode.

Figure 5:
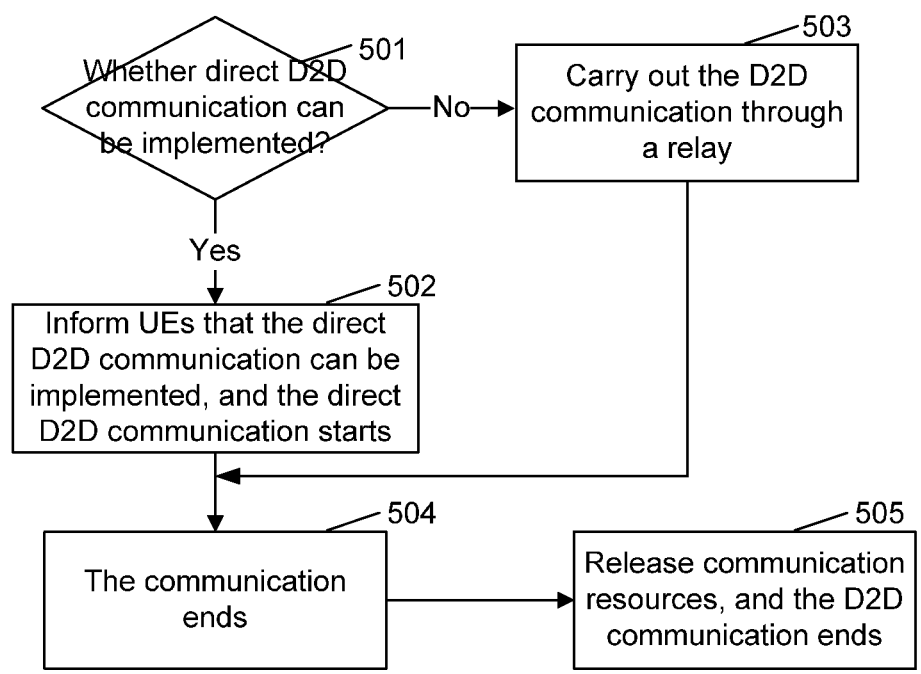
FIG. 5 is a flowchart illustrating a method for communication between devices in a scenario where a D2D communication is implemented through a relay according to a second embodiment of the disclosure.

FIG. 5 is a flowchart illustrating a method for communication between devices in a scenario where D2D communication is implemented through a relay according to a second embodiment of the disclosure. As shown in FIG. 5, the method mainly includes the following steps:

Step 501: A network side device determines whether UEs can implement direct D2D communication can be implemented. If the UEs can implement the direct D2D communication, Step 502 is executed. If the UEs cannot implement the D2D communication, Step 503 is executed.

If the network side device determines that the UEs have the D2D communication capability, but the UEs are out of the coverage of the proximity area where the direct D2D communication is available, then the network side device may select a relay to implement the D2D communication, that is, Step 503 is executed.

Step 502: The network side device informs the UEs of the result of the determination and configures resources for the direct D2D communication, and the direct D2D communication starts.

This step is the same as Step 302 and is therefore not described here repeatedly.

Step 503: The network side device configures a D2D communication path including a relay, and a D2D communication starts.

The relay selected by the network side device may be a UE or an eNB.

If the relay is a UE, then the UE needs to have a D2D communication relay capability, and the network side device can determine, according to the subscription data of the UE, whether the UE has the D2D communication relay capability.

At most one relay can be included in a D2D communication path. The UEs communicating with each other through a relay are located in the coverage range of the same eNB, and UEs which are out of the coverage range of the same eNB may communicate with each other through a network.

The configuration of the communication path by the network side device further includes: setting communication resources including a relay.

The relay which transparently forwards the service data between the UEs is transparent to the users, that is, the user is unaware of the communication implemented by using the relay.

Step 504: The communication continues until the D2D communication ends.

The network side device monitors the D2D communication to guarantee the quality of the D2D communication and charge for the D2D communication.

The network side device ends the D2D communication when the D2D communication is completed or when the UEs are out of the coverage of the proximity area where the D2D communication is available or when there is another reason (e.g., there is a call of a higher priority or an emergency call).

Step 505: The network side device releases the resources for the D2D communication, and the D2D communication ends.

The network side device releases the resources for the D2D communication, and the D2D communication ends. If the D2D communication is implemented through a relay, then the released resources for the D2D communication include the resources of the relay.

If the communication is not completed, then the network side device may continue the communication by switching the communication mode to the architecture communication mode.

Figure 6:
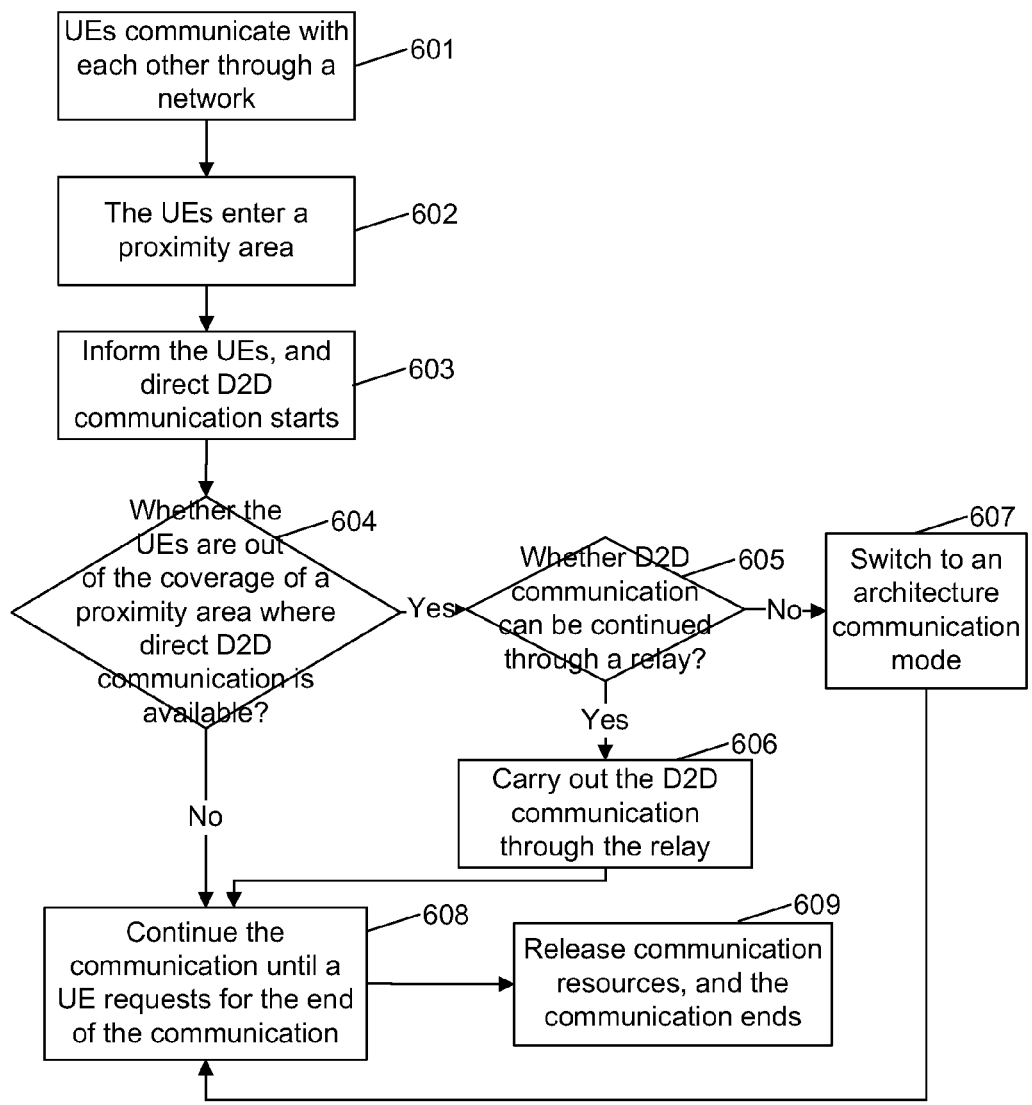
FIG. 6 is a flowchart illustrating a method for communication between devices in a scenario where switching is performed between a direct D2D communication mode and an architecture communication mode according to a third embodiment of the disclosure.

FIG. 6 is a flowchart illustrating a method for communication between devices in a scenario where switching is performed between a direct D2D communication mode and an architecture communication mode according to a third embodiment of the disclosure. As shown in FIG. 6, the method mainly includes the following Steps:

Step 601: UEs are communicating with each other through a network.

The UEs are communicating with each other through a network, as shown in FIG. 1, i.e., a normal architecture communication mode.

Step 602: The UEs enter a proximity area.

The UEs enter the proximity area due to the movement of the UEs. The proximity area, aiming to a specific UE, refers to a geographic area in which the D2D communication can be implemented between UEs.

If the UEs enter a proximity area and subscribe a service of direct D2D communication, then a network side device sends a proximity area notification message to the UEs. The proximity area notification message includes: a user list presenting all users subscribing the service of direct D2D communication in the current proximity area, or a product advertisement sent from a merchant to the UE which has entered the proximity area. The network side device updates the proximity area notification message when a UE enters or leaves the proximity area.

Step 603: The network side device establishes the resources for direct D2D communication for the UEs which are in the coverage of the proximity area, and the direct D2D communication starts.

After the direct D2D communication starts, the network side device releases the previous resources for the architecture communication. The direct D2D communication is transparent to a user, i.e., the user is unaware of the switching of the communication mode to a direct D2D communication mode.

Step 604: The network side device monitors the direct D2D communication, and determines whether the UEs are out of the coverage of the proximity area where the direct D2D communication is available. If the UEs are out of the coverage of the proximity area where the D2D communication is available, Step 605 is executed. If the UEs are in the coverage of the proximity area where the D2D communication is available, Step 608 is executed.

Step 605: The network side device determines whether the D2D communication can be continued through a relay. If the D2D communication can be continued through a relay, Step 606 is executed. If the D2D communication cannot be continued through a relay, Step 607 is executed.

This step is the same as Step 303 and is therefore not described here repeatedly.

Step 606: The network side device configures a D2D communication path including a relay, and the UEs continue the D2D communication through the relay.

This step is the same as Step 503 and is therefore not described here repeatedly.

Step 607: The network side device switching, for the UEs, from the current communication mode to the architecture communication mode.

When the UEs cannot implement the direct D2D communication or when the UEs cannot implement the D2D communication through a relay, the network side device switches the communication mode to the architecture communication mode.

Step 608: The communication continues until the D2D communication ends.

This step is the same as Step 504 and is therefore not described here repeatedly.

Step 609: The network side device releases communication resources, and the communication ends.

This step is the same as Step 505 and is therefore not described here repeatedly.

Figure 7:
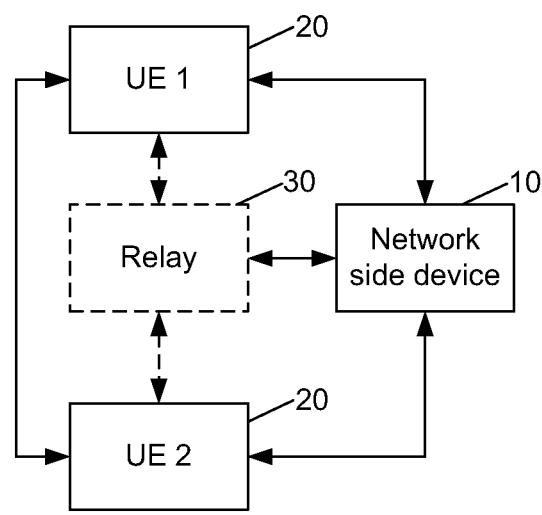
FIG. 7 is a schematic diagram illustrating a structure of a system for communication between devices in proximity according to the disclosure.

Corresponding to the foregoing method for communication between devices in proximity, the disclosure also provides a system for communication between devices in proximity. As shown in FIG. 7, the system includes a network side device 10 and UEs 20.

The network side device 10 is configured to: determine whether the UEs 20 meet a direct D2D communication condition; when the network side device 10 determines that the UEs 20 meet the direct D2D communication condition, inform the UEs 20 of the result of the determination and configure resources for direct D2D communication for the UEs 20 according to requirements of the UEs 20; when the network side device 10 determines that the UEs 20 do not meet the direct D2D communication condition, configure resources for a architecture communication for the UEs 20 according to the requirements of the UEs.

The UEs 20 are configured to communicate with each other by using the resources configured by the network side device 10.

Preferably, the system further includes a relay 30, the network side device 10 is further configured to: after the network side device determines that the UEs do not meet the direct D2D communication condition, determine whether the UEs meet a condition for D2D communication through a relay; when the UEs meet the condition for D2D communication through a relay, configure for the UEs 20 a D2D communication path including the relay 30; and when the UEs do not meet the condition for D2D communication through a relay, configure the resources for architecture communication for the UEs 20; and accordingly, the relay 30 is configured to provide a data relay service for the UEs 20 implementing the D2D communication through the relay 30.

The network side device 10 is further configured to, during the process of the communication between the UEs 20, perform switching between a direct D2D communication mode and an architecture communication mode according to the spacing distance between the UEs 20, or perform switching among a direct D2D communication mode, a mode where D2D communication is implemented through a relay and an architecture communication mode according to the spacing distance between the UEs 20.

Figure 8:
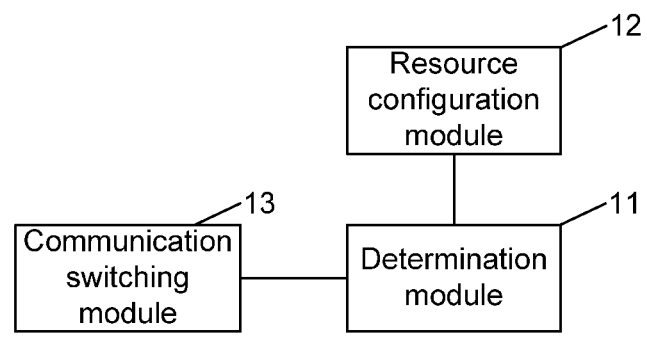
FIG. 8 is a schematic diagram illustrating a structure of a network side device according to the disclosure.

Preferably, as shown in FIG. 8, the network side device 10 may further include a determination module 11 and a resource configuration module 12. The determination module 11 is configured to determine whether the UEs 20 meet a direct D2D communication condition and inform the resource configuration module 12 of the result of the determination. The resource configuration module 12 is configured to: when the result of the determination of the determination module 11 is that the UEs meet the direct D2D communication condition, inform the UEs 20 of the result of the determination and configure resources for direct D2D communication for the UEs 20 according to requirements of the UEs; and when the result of the determination of the determination module 11 is that the UEs do not meet the direct D2D communication condition, configure resources for architecture communication for the UEs according to the requirements of the UEs 20.

The determination module 11 is further configured to, after the network side device 11 determines that the UEs 20 do not meet the direct D2D communication condition, determine whether the UEs 20 meet a condition for D2D communication through a relay, and inform the resource configuration module 12 of the result of the determination.

Accordingly, the resource configuration module 12 is further configured to configure for the UEs 20 a D2D communication path including a relay 30 when the determination module determines that the UEs 20 meet the condition for D2D communication through a relay, or configure the resources for the architecture communication for the UEs 20 when the determination module 11 determines that the UEs 20 do not meet the condition for D2D communication through a relay.

The network side device 10 may further include a communication switching module 13, which is connected with the determination module 11 and is configured to, during the process of the communication between the UEs 20, perform switching between a direct D2D communication mode and an architecture communication mode according to the spacing distance between the UEs 20, or perform switching among the direct D2D communication mode, a mode where D2D communication is implemented through a relay and the architecture communication mode according to the spacing distance between the UEs 20.

Figure 9:
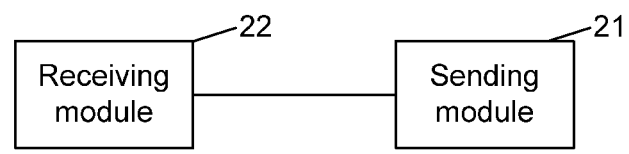
FIG. 9 is a schematic diagram illustrating a structure of a UE according to the disclosure.

Preferably, as shown in FIG. 9, the UE 20 may further include a sending module 21 and a receiving module 22. The sending module 21 is configured to send subscription data supportive of D2D communication to the network side device 10 and send communication data by using resources configured by the network side device 10. The receiving module 22 is configured to receive the communication data by using the resources configured by the network side device 10.

The resources configured by the network side device refer to: resources for direct D2D communication, a D2D communication path including a relay or resources for architecture communication.

The receiving module 22 is further configured to receive a proximity area notification message from the network side device 10.

Accordingly, the sending module 21 is further configured to send a D2D confirmation indication message to the network side device 10 after the receiving module 22 receives the proximity area notification message.

The above are merely the preferred embodiments of the disclosure, but are not intended to limit the scope of protection of the disclosure.

The invention claimed is:

1. A method for communication between devices in proximity, comprising:
    determining, by a network side device, whether User Equipments (UEs) meet a direct Device to Device (D2D) communication condition;
    when the network side device determines that the UEs meet the direct D2D communication condition, informing, by the network side device, the UEs of the result of the determination, and configuring resources for direct D2D communication for the UEs according to requirements of the UEs; and
    when the network side device determines that the UEs do not meet the direct D2D communication condition, configuring, by the network side device, resources for architecture communication for the UEs according to the requirements of the UEs.

2. The method according to claim 1, further comprising: after the network side device determines that the UEs do not meet the direct D2D communication condition,
    determining, by the network side device, whether the UEs meet a condition for D2D communication through a relay;
    when the UEs meet the condition for D2D communication through a relay, configuring, by the network side device, for the UEs a D2D communication path including a relay; and
    when the UEs do not meet the condition for D2D communication through a relay, configuring, by the network side device, the resources for the architecture communication for the UEs.

3. The method according to claim 2, wherein the condition for D2D communication through a relay comprises: the UEs are out of the coverage of a proximity area where direct D2D communication is available, each of the UEs has a D2D communication capability, and there is a relay having a communication relay capability for providing communication relay for the UEs.

4. The method according to claim 2, further comprising:
    during a process of the communication between the UEs, performing, by the network side device, switching among a direct D2D communication mode, a mode where D2D communication is implemented through a relay and an architecture communication mode according to spacing distance between the UEs.

5. The method according to claim 1, wherein the D2D communication condition comprises: the UEs are in the coverage of a proximity area where the direct D2D communication is available, and each of the UEs has a D2D communication capability.

6. The method according to claim 1, further comprising:
    during a process of the communication between the UEs, performing, by the network side device, switching between a direct D2D communication mode and an architecture communication mode according to spacing distance between the UEs.

7. A system for communication between devices in proximity, comprising: a network side device and User Equipments (UEs), wherein
    the network side device is configured to: determine whether the user equipments meet a direct Device to Device (D2D) communication condition; when the network side device determines that the UEs meet the direct D2D communication condition, inform the UEs of the result of the determination, and configure resources for direct D2D communication for the UEs according to requirements of the UEs; and when the network side device determines that the UEs do not meet the direct D2D communication condition, configure resources for architecture communication for the UEs according to the requirements of the UEs; and
the UEs are configured to communicate with each other by using the resources configured by the network side device.

8. The system according to claim 7, further comprising: a relay;
wherein the network side device is further configured to: after the network side device determines that the UEs do not meet the direct D2D communication condition, determine whether the UEs meet a condition for D2D communication through a relay; when the UEs meet the condition for D2D communication through a relay, configure for the UEs a D2D communication path including the relay; and when the UEs do not meet the condition for D2D communication through a relay, configure the resources for architecture communication for the UEs; and
wherein the relay is configured to provide a data relay service for the UEs between which D2D communication is implemented through the relay.

9. The system according to claim 8, wherein the condition for D2D communication through a relay comprises: the UEs are out of the coverage of a proximity area where the direct D2D communication is available, each of the UEs has a D2D communication capability, and there is a relay having a communication relay capability for providing communication relay for the UEs.

10. The system according to claim 8, wherein the network side device is further configured to:
during a process of the communication between the UEs, perform switching among a direct D2D communication mode, a mode where D2D communication is implemented through a relay and an architecture communication mode according to spacing distance between the UEs.

11. The system according to claim 7, wherein the D2D communication condition comprises: the UEs are in the coverage of a proximity area where direct D2D communication is available, and each of the UEs has a D2D communication capability.

12. The system according to claim 7, wherein the network side device is further configured to:
during a process of the communication between the UEs, perform switching between a direct D2D communication mode and an architecture communication mode according to spacing distance between the UEs.

13. A network side device, comprising: a determination module and a resource configuration module, wherein
the determination module is configured to determine whether User Equipments (UEs) meet a direct Device to Device (D2D) communication condition and inform the resource configuration module of the result of the determination; and
the resource configuration module is configured to: when the result of the determination of the determination module is that the UEs meet the direct D2D communication condition, inform the UEs of the result of the determination, and configure resources for direct D2D communication for the UEs according to requirements of the UEs; and when the result of the determination of the determination module is that the UEs do not meet the direct D2D communication condition, configure resources for architecture communication for the UEs according to the requirements of the UEs.

14. The network side device according to claim 13, wherein the determination module is further configured to, after the network side device determines that the UEs do not meet the direct D2D communication condition, determine whether the UEs meet a condition for D2D communication through a relay, and inform the resource configuration module of the result of the determination; and
the resource configuration module is further configured to configure for the UEs a D2D communication path including a relay when the determination module determines that the UEs meet the condition for D2D communication through a relay, or configure the resources for the architecture communication to e UEs when the determination module determines that the UEs do not meet the condition for D2D communication through a relay.

15. The network side device according to claim 14, wherein the condition for D2D communication through a relay comprises: the UEs are out of the coverage of a proximity area where the direct D2D communication is available, each of the UEs has a D2D communication capability, and there is a relay having a communication relay capability for providing communication relay for the UEs.

16. The network side device according to claim 14, further comprising: a communication switching module configured to perform switching among a direct D2D communication mode, a mode where D2D communication is implemented through a relay and an architecture communication mode according to spacing distance between the UEs during a process of the communication between the UEs.

17. The network side device according to claim 13, wherein the D2D communication condition comprises: the UEs are in the coverage of a proximity area where direct D2D communication is available, and each of the UEs has a D2D communication capability.

18. The network side device according to claim 13, further comprising: a communication switching module configured to perform switching between a direct D2D communication mode and an architecture communication mode according to the spacing distance between the UEs during a process of the communication between the UEs.

19. A User Equipment (UE), comprising: a sending module and a receiving module,
wherein the sending module is configured to send subscription data indicating the UE is supportive of Device to Device (D2D) communication to a network side device and to send communication data by using resources configured by the network side device,
wherein the receiving module is configured to receive communication data by using the resources configured by the network side device,
wherein the resources configured by the network side device comprises:
resources for direct D2D communication, a D2D communication path including a relay, or resources for architecture communication.

20. The UE according to claim 19, wherein the receiving module is further configured to receive a proximity area notification message from the network side device; and
the sending module is further configured to send a D2D confirmation indication message to the network side device after the receiving module receives the proximity notification message.

* * * * *